(12) United States Patent
Mason et al.

(10) Patent No.: US 7,698,367 B2
(45) Date of Patent: Apr. 13, 2010

(54) SYSTEM AND METHOD FOR PRESENCE ENABLED E-MAIL DELIVERY

(75) Inventors: Andrew Mason, Sunnyvale, CA (US); Rami Caspi, Sunnyvale, CA (US); William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 1113 days.

(21) Appl. No.: 10/384,206

(22) Filed: Mar. 6, 2003

(65) Prior Publication Data

US 2004/0177119 A1 Sep. 9, 2004

(51) Int. Cl.
*G06F 15/16* (2006.01)
(52) U.S. Cl. .................... 709/206; 709/203; 709/204; 709/205; 709/207
(58) Field of Classification Search .......... 709/203, 709/204, 205, 206, 207
See application file for complete search history.

(56) References Cited

U.S. PATENT DOCUMENTS

| | | | |
|---|---|---|---|
| 5,790,649 A | 8/1998 | Hiroshige | |
| 6,442,593 B1 * | 8/2002 | Wang et al. | 709/206 |
| 6,502,128 B1 * | 12/2002 | Kumpf | 709/221 |
| 6,677,968 B1 * | 1/2004 | Appelman | 715/853 |
| 6,707,890 B1 * | 3/2004 | Gao et al. | 379/88.12 |
| 6,959,324 B1 * | 10/2005 | Kubik et al. | 709/206 |
| 7,111,044 B2 * | 9/2006 | Lee | 709/204 |
| 7,272,625 B1 * | 9/2007 | Hannel et al. | 709/200 |
| 7,359,938 B1 * | 4/2008 | Davies et al. | 709/204 |
| 7,401,158 B2 * | 7/2008 | Beauchamp et al. | 709/238 |
| 7,603,411 B1 * | 10/2009 | Davies et al. | 709/204 |
| 2002/0013826 A1 * | 1/2002 | Hughes et al. | 709/219 |
| 2002/0021307 A1 | 2/2002 | Glenn et al. | |
| 2002/0023135 A1 * | 2/2002 | Shuster | 709/206 |
| 2002/0042830 A1 * | 4/2002 | Bose et al. | 709/230 |
| 2002/0065894 A1 * | 5/2002 | Dalal et al. | 709/206 |
| 2002/0073158 A1 * | 6/2002 | Dalal et al. | 709/206 |
| 2002/0078158 A1 * | 6/2002 | Brown et al. | 709/206 |
| 2002/0083127 A1 * | 6/2002 | Agrawal | 709/203 |
| 2002/0083136 A1 | 6/2002 | Whitten, II | |
| 2002/0107928 A1 * | 8/2002 | Chalon | 709/206 |
| 2002/0120600 A1 * | 8/2002 | Schiavone et al. | 707/1 |
| 2002/0129052 A1 * | 9/2002 | Glazer et al. | 707/501.1 |

(Continued)

FOREIGN PATENT DOCUMENTS

EP 0 999 509 5/2000

(Continued)

*Primary Examiner*—Kenny S Lin
*Assistant Examiner*—Hieu T Hoang

(57) ABSTRACT

A telecommunications system includes a network (102), a destination multimedia server (104), and a destination presence server (215) operably coupled to the network. A plurality of multimedia clients (122) are also operably coupled to the network. The multimedia clients (122) include a presence option (128) and are adapted to be able to select whether the option is to be activated. In operation, when a client sends an e-mail to another client, the destination multimedia server (104) receives the e-mail and determines if the recipient supports presence. If so, the destination multimedia server (104) sends a query to the destination presence server (215) to check the recipient's presence. If the recipient is present, the message can be delivered. If not, the message can be held on the server until the recipient is present.

29 Claims, 9 Drawing Sheets

U.S. PATENT DOCUMENTS

| | | | |
|---|---|---|---|
| 2002/0143876 A1* | 10/2002 | Boyer et al. | 709/205 |
| 2002/0147777 A1* | 10/2002 | Hackbarth et al. | 709/205 |
| 2002/0178231 A1 | 11/2002 | Matsa et al. | |
| 2003/0023691 A1 | 1/2003 | Knauerhase | |
| 2003/0055983 A1* | 3/2003 | Callegari | 709/227 |
| 2003/0120732 A1* | 6/2003 | Couts et al. | 709/206 |
| 2003/0204721 A1 | 10/2003 | Barrus et al. | |
| 2003/0217109 A1* | 11/2003 | Ordille et al. | 709/206 |
| 2003/0236847 A1 | 12/2003 | Benowitz et al. | |
| 2004/0059781 A1* | 3/2004 | Yoakum et al. | 709/204 |
| 2004/0064514 A1* | 4/2004 | Daniell et al. | 709/206 |
| 2004/0073614 A1* | 4/2004 | Blohm | 709/206 |
| 2004/0122901 A1* | 6/2004 | Sylvain | 709/206 |
| 2008/0046556 A1* | 2/2008 | Nicholls et al. | 709/224 |

FOREIGN PATENT DOCUMENTS

| | | |
|---|---|---|
| EP | 1 102 443 | 5/2001 |
| WO | WO 01/17165 | 3/2001 |

\* cited by examiner

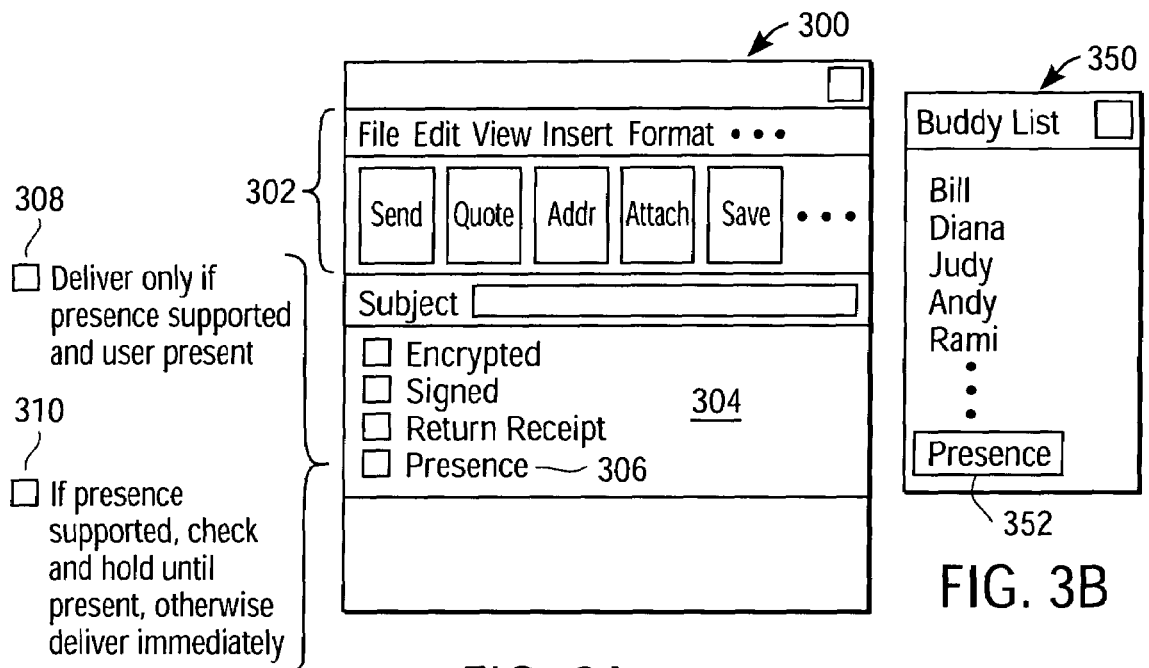
FIG. 3A
FIG. 3B
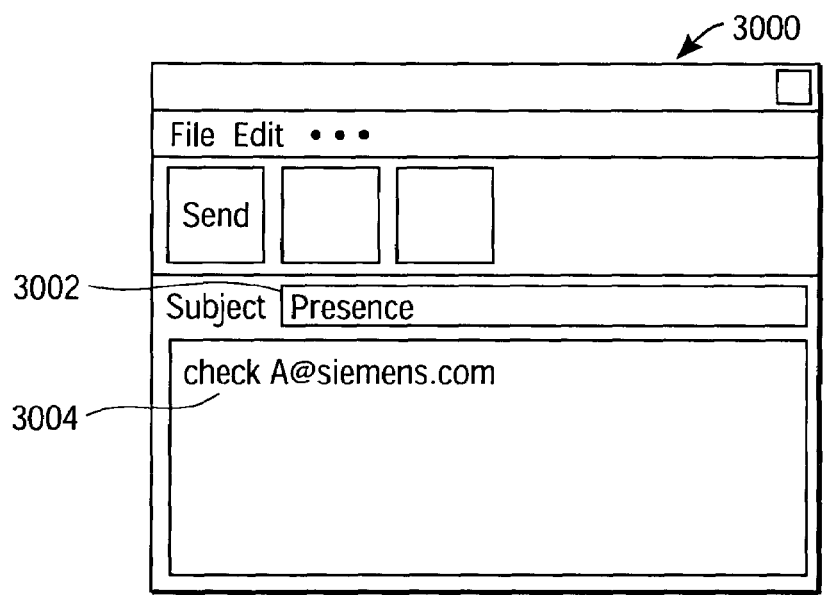
FIG. 3C

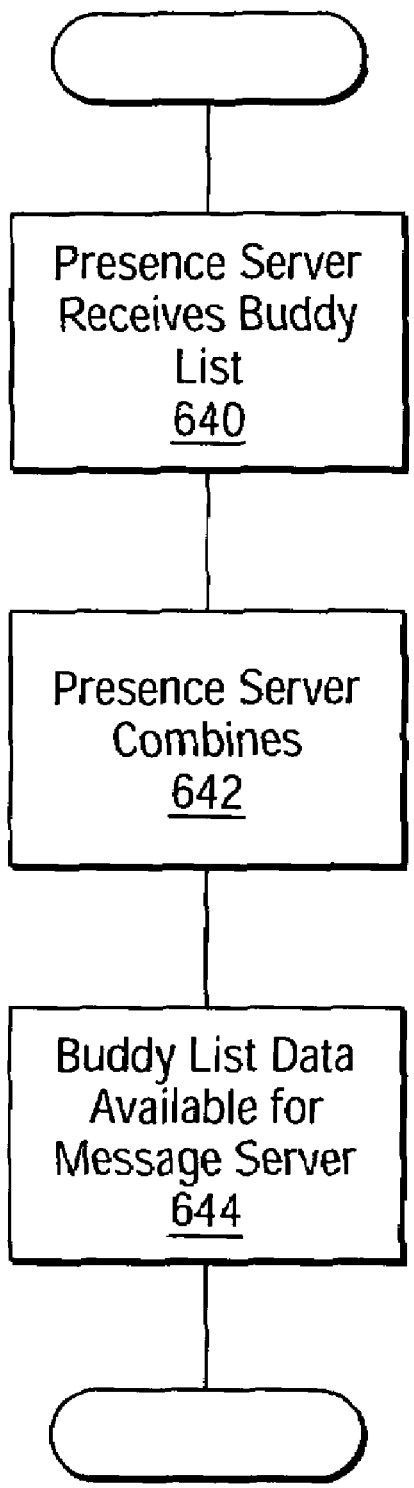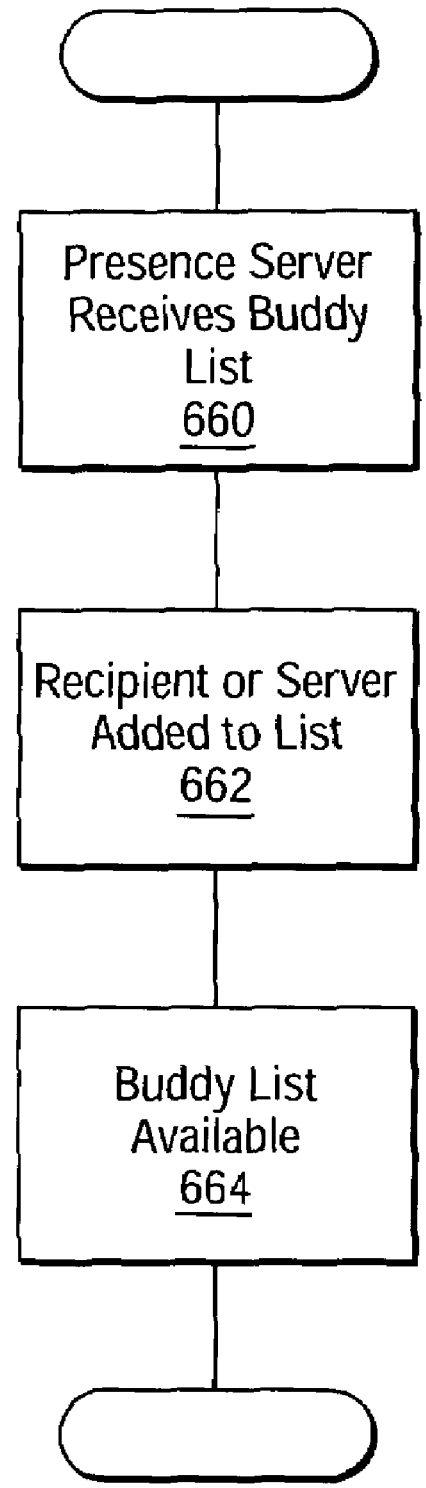
FIG. 6C
FIG. 6D

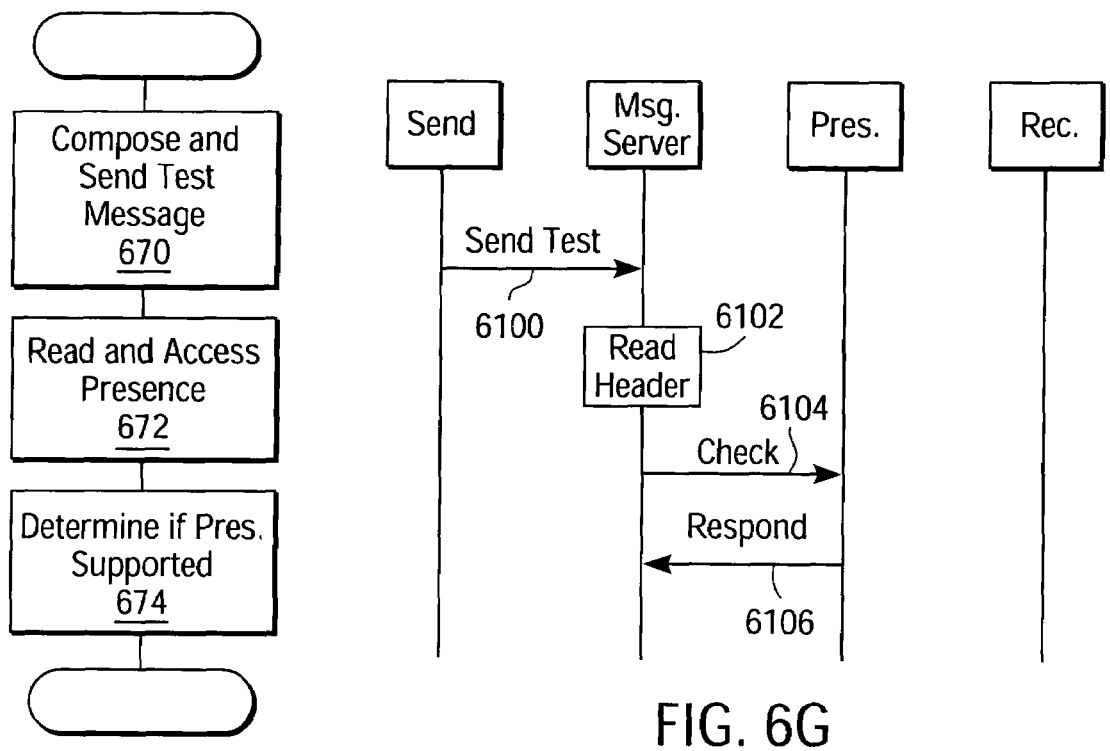
FIG. 6F
FIG. 6G
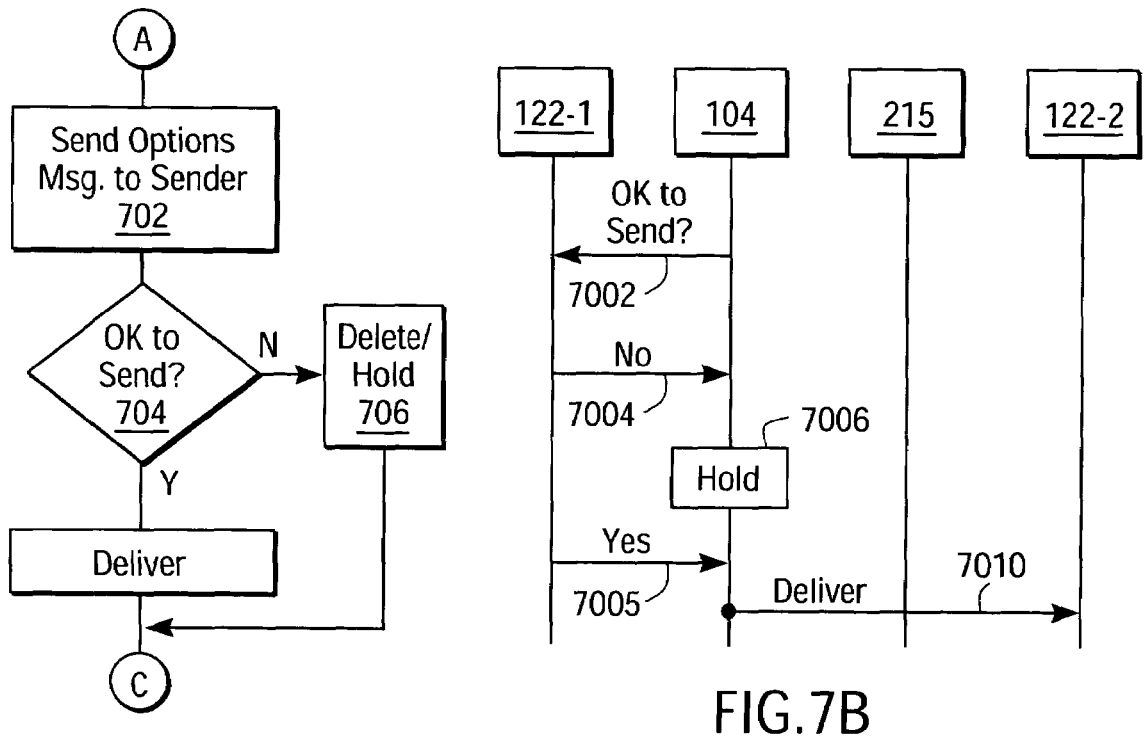
FIG. 7A
FIG. 7B

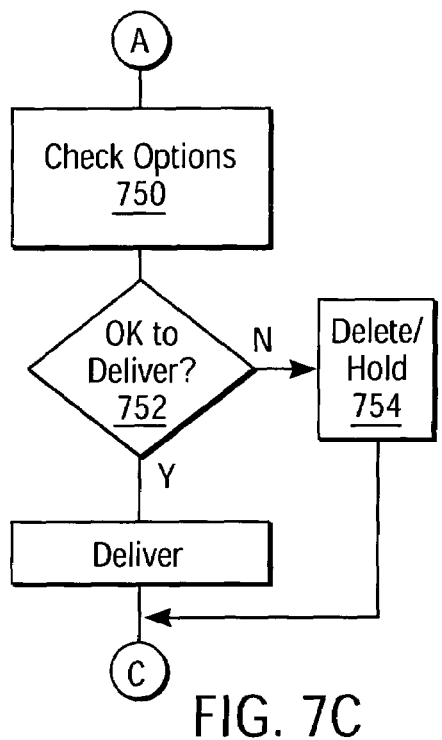
FIG. 7C
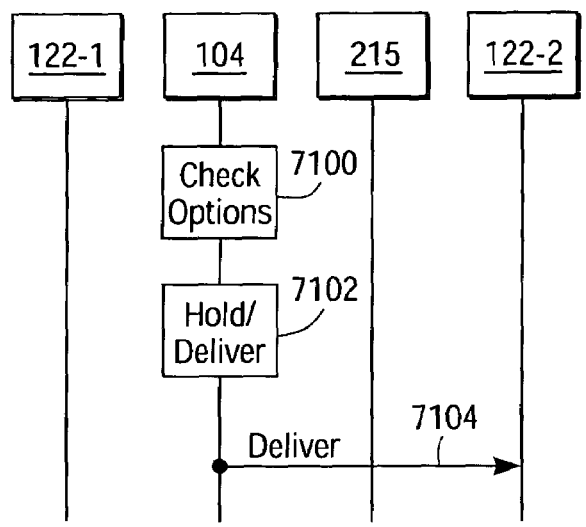
FIG. 7D
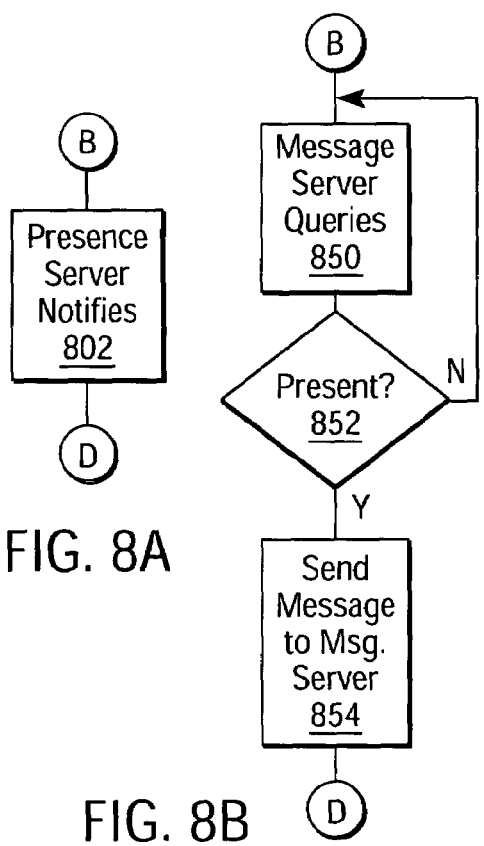
FIG. 8A
FIG. 8B
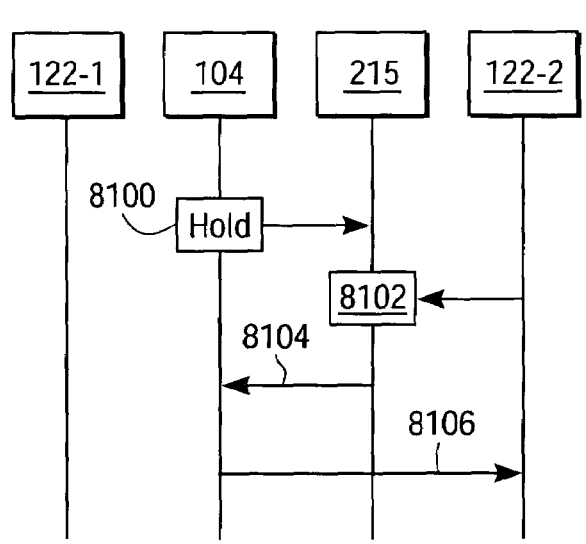
FIG. 8C

SYSTEM AND METHOD FOR PRESENCE ENABLED E-MAIL DELIVERY

CROSS REFERENCE TO RELATED APPLICATIONS

This application is related to co-pending application Ser. No. 10/383,800, titled SYSTEM AND METHOD FOR E-MAIL PRESENCE CONFIRMATION, filed concurrently herewith.

FIELD OF THE INVENTION

The present invention relates to telecommunications systems and, in particular, to an improved system and method for delivery of electronic messages.

BACKGROUND OF THE INVENTION

Electronic messaging, or e-mail, has rapidly become an essential business and personal tool. However, typical e-mail systems are disadvantageous in that they provide no way to ensure that a recipient of an e-mail is actually present to receive it.

In general, e-mail messages may not be of particular importance, and therefore it may not matter much if the message sits unopened on a recipient's computer. However, some messages may be of sufficient sensitivity that there could be a security or other risk in leaving them sitting unopened on a recipient's computer.

For example, a recipient may not necessarily want an e-mail of a personal nature to be available for casual perusal by someone with access to the computer. Similarly, a personnel supervisor may have a secretary monitor his e-mail while he is away. The supervisor might not want the secretary to view an e-mail containing complaints about other personnel. In other cases, the sender may deem an e-mail of sufficient import that wants it to appear prominently at the recipient's mailbox and not "buried" in spam.

As such, there is a need for a system and method for preventing viewing of an e-mail by a third party. There is a further need for a system and method for ensuring that an e-mail recipient is present to receive an e-mail before it is sent.

SUMMARY OF THE INVENTION

These and other drawbacks in the prior art are overcome in large part by a system and method according to embodiments of the present invention.

A telecommunications system according to an embodiment of the present invention includes a network, a destination multimedia server, and a destination presence server operably coupled to the network. A plurality of multimedia clients are also operably coupled to the network. The multimedia clients include a presence option and are adapted to be able to select whether the option is to be activated. In operation, when a client sends an e-mail to another client, the destination multimedia server receives the e-mail and determines if the recipient supports presence. If so, the destination multimedia server sends a query to the destination presence server to check the recipient's presence. If the recipient is present, the message can be delivered. If not, the message can be held on the server until the recipient is present.

A method according to an embodiment of the present invention includes activating an e-mail presence option associated with an e-mail; determining if an intended recipient is a party to the presence function; and waiting to deliver the e-mail message to the recipient if the recipient supports presence until the recipient is, in fact, present. If the recipient does not support presence, then the e-mail may either be delivered or held until such time as the sender chooses.

In one embodiment of the present invention, a multimedia server queries a presence server upon reception of an e-mail for a supported user. If the intended recipient supports presence or is in fact present, then the presence server sends an "OK" message to the multimedia server, allowing the message to go through. In other embodiments, the multimedia server can directly access the "buddy list" of the recipient. In still other embodiments, the multimedia server can be set on everyone's buddy list as a hidden user for presence purposes.

A better understanding of these and other specific embodiments of the invention is obtained when the following detailed description is considered in conjunction with the following drawings.

BRIEF DESCRIPTION OF THE DRAWINGS

FIG. 3A-FIG. 3C illustrate graphical user interfaces according to embodiments of the present invention;

FIGS. 5A and 5B illustrate operation of an embodiment of the present invention;

FIG. 6A-FIG. 6G illustrate operation of embodiments of the present invention;

FIG. 7A-FIG. 7D are flowcharts illustrating operation of embodiments of the present invention;

FIG. 8A-FIG. 8B are flowcharts illustrating operation of embodiments of the present invention; and FIG. 8C illustrates operation of an embodiment of the present invention.

DETAILED DESCRIPTION OF EMBODIMENTS OF THE INVENTION

Figure 1:
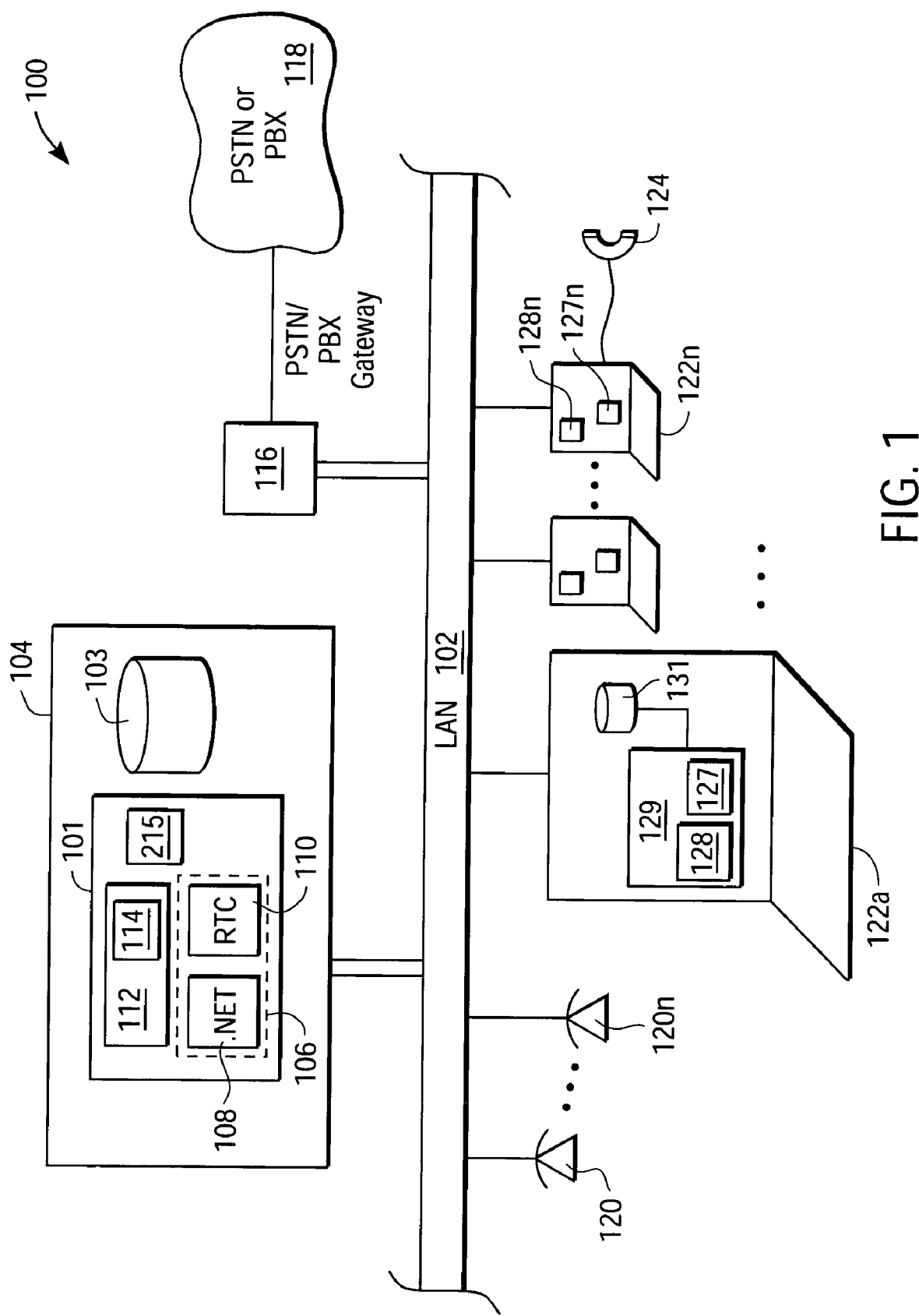
FIG. 1 is a diagram of a telecommunication system according to an embodiment of the present invention.

Turning now to the drawings and, with particular attention to FIG. 1, a diagram of an exemplary telecommunications system 100 according to an embodiment of the present invention is shown. It is noted that, while a particular network configuration is illustrated, the present invention is not so limited. Thus, the figures are exemplary only.

As shown, the telecommunications system 100 includes a packet network such as a local area network (LAN) 102. The LAN 102 may be implemented using a TCP/IP network and may implement voice or multimedia over IP using, for example, the Session Initiation Protocol (SIP). Operably coupled to the local area network 102 is a mail or multimedia server 104. The multimedia server 104 may include one or more controllers 101, which may be embodied as one or more microprocessors, and memory 103 for storing application programs and data. The controller 101 implements an instant messaging system 106. The instant messaging system may be embodied as Microsoft Windows Messenger or other instant messaging system. Thus, according to certain embodiments of the present invention, the instant messaging system 106 implements the Microsoft.Net environment 108 and Real Time Communications protocol (RTC) 110.

In addition, according to embodiments of the present invention, an e-mail message presence system 114 may be provided, which may be part of an interactive suite of applications 112, run by controller 101, and typically stored in memory 103, as will be described in greater detail below. The e-mail message presence system 114 is used to determine if a party supports presence. The multimedia server 104 may also implement a presence server 215 in association with or distinct from the instant messaging system 106. The presence server or module 215 is used to determine whether a recipient is present, as will be explained in greater detail below.

Also coupled to the LAN 102 is a gateway 116 which may be implemented as a gateway to a private branch exchange (PBX), the public switched telephone network (PSTN) 118, or any of a variety of other networks, such as a wireless or cellular network. In addition, one or more LAN telephones 120a-120n and one or more computers 122a-122n may be operably coupled to the LAN 102.

The computers 122a-122n may be personal computers implementing the Windows XP operating system and thus, Windows Messenger. In addition, the computers 122a-122n may include telephony and other multimedia messaging capability using, for example, peripheral cameras, microphones and speakers (not shown) or peripheral telephony handsets 124. In other embodiments, one or more of the computers may be implemented as wireless telephones, digital telephones, or personal digital assistants (PDAs). Thus, the figures are exemplary only. As shown with reference to computer 122a, the computers may include one or more controllers 129, such as Pentium-type microprocessors, and storage 131 for applications and other programs.

Finally, the computers 122a-122n may implement e-mail or messaging clients 127a-127n and Presence Services 128a-128n according to embodiments of the present invention. As will be described in greater detail below, according to embodiments of the present invention, the Presence Services 128 allow access to the e-mail message presence activation system 114 and the presence system 215 of the server 104 and thus permit the user to determine if an e-mail recipient is present. The Presence Services 128 may be implemented in conjunction with Instant Messaging applications and the Presence Server 215.

Figure 2:
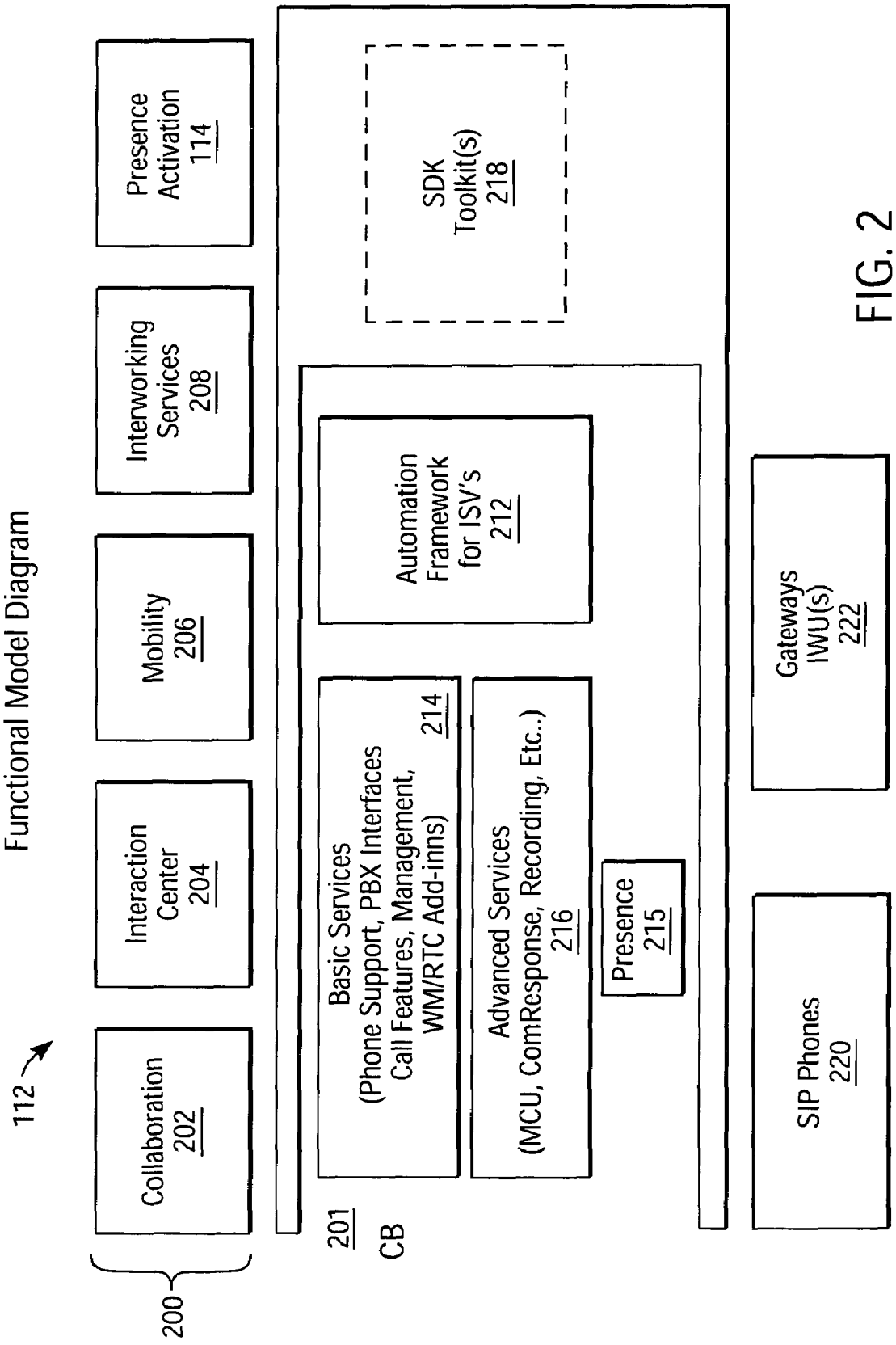
FIG. 2 is a diagram illustrating a telecommunications collaboration system according to an embodiment of the present invention.

Turning now to FIG. 2, a functional model diagram illustrating e-mail message presence system 114 is shown. More particularly, FIG. 2 is a logical diagram illustrating a particular embodiment of a multimedia server 104, with the Instant Messaging system 106 (FIG. 1) omitted for sake of simplicity. The server 104 includes a plurality of application modules 200 and a communication broker module 201. The server 104 also provides interfaces, such as APIs (application programming interfaces) to SIP phones 220 and gateways/interworking units 222. Typically, such application modules are stored in memory 103 and executed by the controller 101 (FIG. 1).

According to the embodiment illustrated, the broker module 201 includes a basic services module 214, a presence module 215, an advanced services module 216, an automation module 212, and a toolkit module 218.

The basic services module 214 functions to implement, for example, phone support, PBX interfaces, call features and management, as well as Windows Messaging and RTC add-ins, when necessary. The advanced services module 216 implements function such as multipoint control unit (MCU), recording, and the like. MCU functions are used for voice conferencing and support ad hoc and dynamic conference creation from a buddy list following the SIP conferencing model for ad hoc conferences. In certain embodiments, support for G.711 and G.723.1 codecs is provided. Further, in certain embodiments, the MCU can distribute media processing over multiple servers using the MEGACO protocol.

The presence module 215 allows maintenance of and access to buddy lists and provide presence status according to embodiments of the present invention. In particular, the presence server 215 may be adapted to determine a presence of an e-mail recipient in response to requests from the e-mail message presence system 114. It is noted that, while shown as integrated with the multimedia server 112, the presence server 215 may also be implemented as a separate unit. Further, in other embodiments, either or both of the multimedia server 104 and the presence server 215 may be services provided on or via the PSTN 118 rather than provided on the LAN 102. Thus, the figures are exemplary only.

Presence features 215 may also provide device context for both SIP registered devices and user-defined non-SIP devices. Various user contexts, such as In Meeting, On Vacation, In the Office, etc., can be provided for. In addition, voice, e-mail and instant messaging availability may be provided across the user's devices. The presence feature 215 enables real time call control using presence information, e.g., to choose a destination based on the presence of a user's devices. In addition, various components have a central repository for presence information and for changing and querying presence information. In addition, the presence module 215 provides a user interface for presenting the user with presence information. Further, as will be discussed in greater detail below, the presence features 215 may function to determine a presence of an e-mail client according to embodiments of the present invention. An aspect of the presence features may employ Instant Messaging buddy lists to determine a recipient's presence. THus, the presence features module 215 may operate in conjunction with the Instant Messaging system 106 (FIG. 1).

The broker module 201 may include the ComResponse platform, available from Siemens Information and Communication Networks, Inc. ComResponse features include speech recognition, speech-to-text, and text-to-speech, and allow for creation of scripts for applications.

Real time call control is provided by a SIP API 220 associated with the basic services module 214. That is, calls can be intercepted in progress and real time actions performed on them, including directing those calls to alternate destinations based on rules and or other stimuli. The SIP API 220 also provides call progress monitoring capabilities and for reporting status of such calls to interested applications. The SIP API 220 also provides for call control from the user interface.

According to the embodiment illustrated, the application modules include a collaboration module 202, an interaction center module 204, a mobility module 206, an interworking services module 208, and an e-mail message presence module 114.

The collaboration module 202 allows for creation, modification or deletion of a collaboration session for a group of users. The collaboration module 202 may further allow for invoking a voice conference from any client. In addition, the collaboration module 202 can launch a multi-media conferencing package, such as the WebEx package. It is noted that the multimedia conferencing can be handled by other products.

The interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

The mobility module 206 provides for message forwarding and "one number" access across media, and message "morphing" across media for the subscriber. Further, various applications can send notification messages to a variety of destinations, such as e-mails, instant messages, pagers, and the like. In addition, the subscriber can set rules that the mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

Further, as will be explained in greater detail below, the e-mail message presence module 114 may be used in conjunction with the user's e-mail system 127 to determine if an e-mail recipient is present to receive the e-mail, as will be explained in greater detail below.

Turning now to FIG. 3A and FIG. 3B, diagrams of exemplary graphical user interfaces according to embodiments of the present invention is shown. In particular, shown in FIG. 3A is an exemplary e-mail window 300. The e-mail window 300 is typically generated by the e-mail or messaging client 127 (FIG. 1). The e-mail window 300 includes a plurality of standard controls 302, such as FILE, EDIT, SEND, etc. Such functionality is known and may be implemented in such e-mail clients as Microsoft Outlook or Netscape Communicator. In addition, an Options window 304 may be provided according to embodiments of the present invention, to allow selection of a presence option 306, as will be described in greater detail below. Selection of the presence option 306 causes the destination multimedia server to determine if the recipient supports presence and is, in fact, present, and deliver the e-mail accordingly. It is noted that a destination multimedia server and a destination presence server may be coupled to the same network as a message sender and a recipient or may be remote from one or the other. In the discussion that follows, intervening gateways and networks are omitted for sake of simplicity.

In addition, according to other embodiments of the present invention, the presence menu options may allow the user to specify conditions of delivery. For example, as shown at 308, the user can select "Deliver only if presence supported and recipient is present." In response, the destination multimedia server and presence server will determine if the user is present. Alternatively, as shown at 310, the user can select "If presence supported, check and hold until present; otherwise deliver immediately." The system will then determine if the recipient is present and hold the message if not.

FIG. 3B illustrates an exemplary buddy list window 350 which may be used by the presence feature of the present invention (for example, in response to an invocation by the interface of FIG. 3A), to determine a recipient's presence. For example, in certain embodiments, the destination server simply accesses the sender's buddy list and Instant Messaging application presence functionality in response to an e-mail for the presence determination. In other embodiments, the server will add the recipient to the sender's buddy list as a "phantom presence" 352. A "phantom" presence is one which is tracked, but is not typically viewable by the parties to whose lists the presences are added. It is noted, however, that the server could add the recipient or the messaging server as "visible" presences. In still other embodiments, the server could collect all the network users' buddy lists in a "super buddy list" or add the server to each user's buddy list as the "phantom presence" so that it can make the presence determination instantly.

Figure 4:
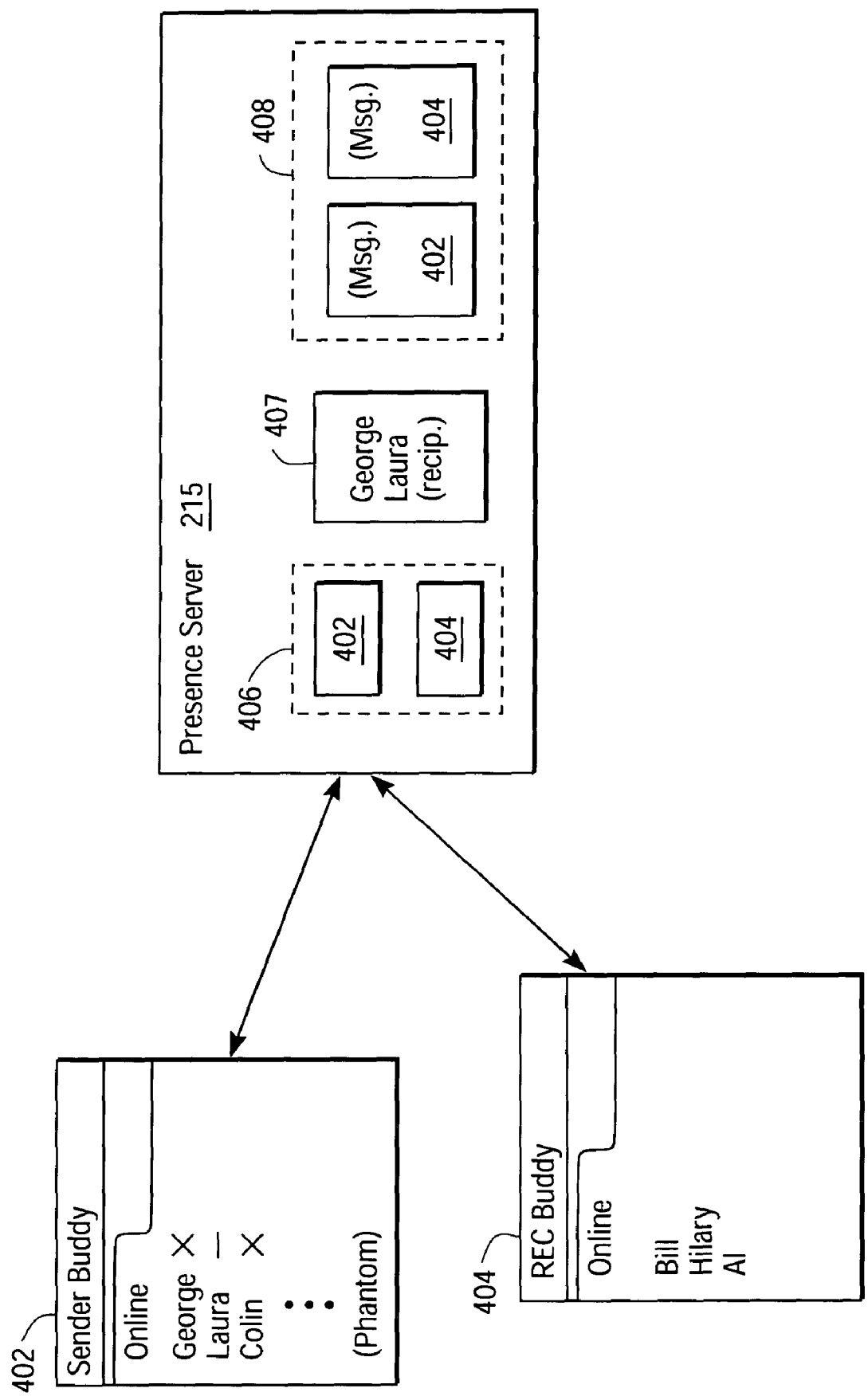
FIG. 4 illustrates use of buddy lists to determine e-mail user presence according to embodiments of the present invention.

This is illustrated more particularly with reference to FIG. 4. Shown at 402 is a first user's buddy list and at 404 is a second user's buddy list. Also shown is presence server 215. In operation, the users 402 and 404 can log in to the presence server 215 in the normal fashion, e.g., using Instant Messaging software 128. The presence server 215 can then provide presence information to the users.

In addition, in certain embodiments of the present invention, the presence server 215 can collect all the parties on the buddy lists into one "super buddy list" 406. This list can then be used by the e-mail presence system, as will be explained in greater detail below. Alternatively, in certain embodiments, the presence server can add the recipient to the user's buddy list, as shown at 407. In other embodiments, the destination messaging server is added to each party's buddy list as a "phantom," so that the presence/IM system can access presence information.

Figures 5A, 6A:
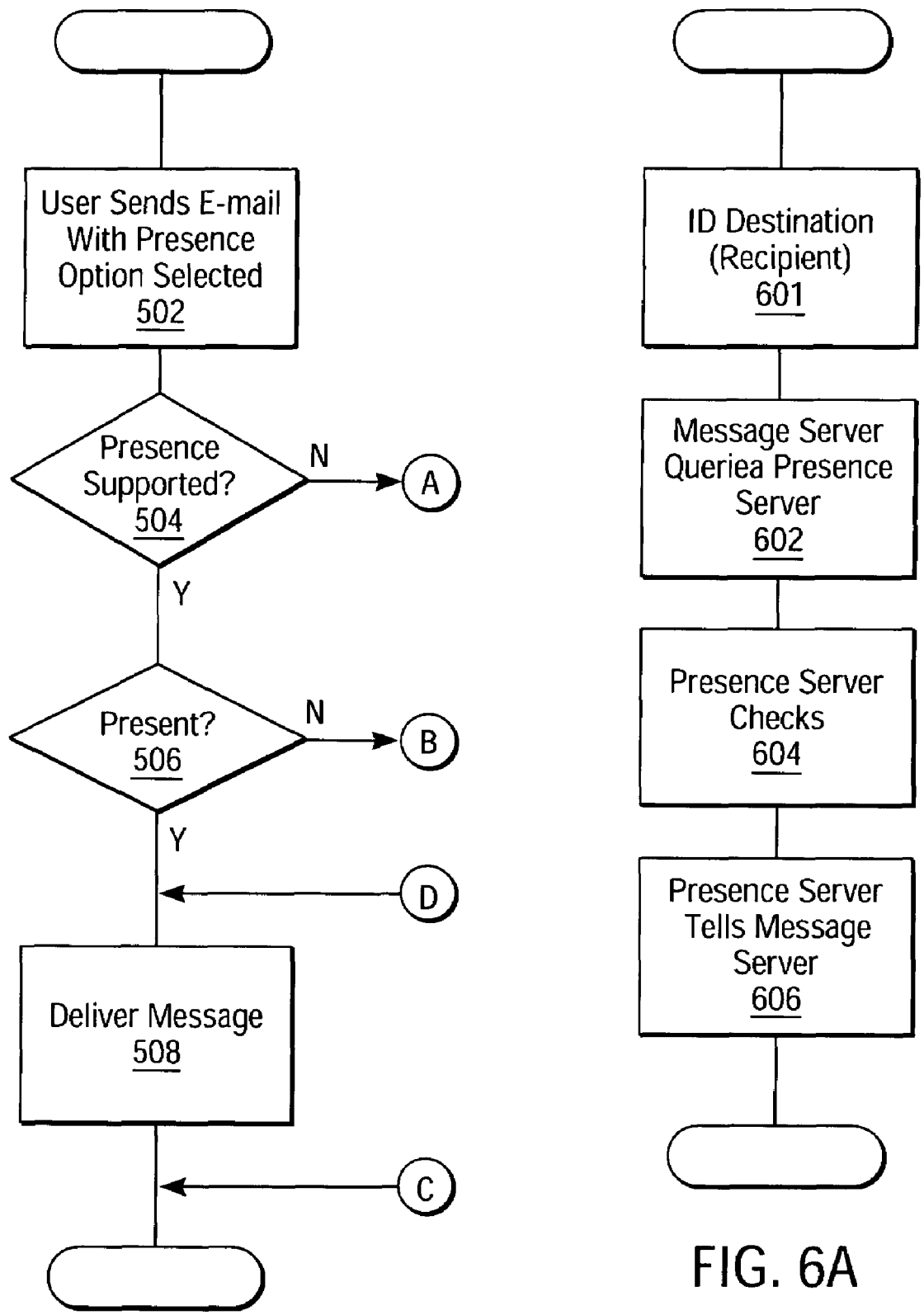
Figure 5B:
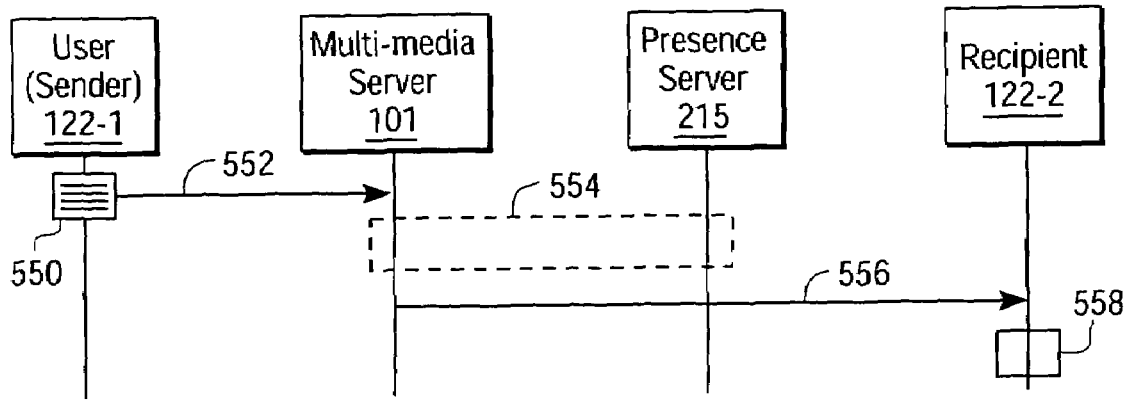

FIG. 5A and FIG. 5B illustrate operation of an embodiment of the present invention. More particularly, FIG. 5A is a flowchart and FIG. 5B is a signaling diagram illustrating e-mail presence handling according to an embodiment of the present invention. Shown in FIG. 5B are a user 122-1, representative of a sender; a multimedia server 104; a presence server 215; and a recipient 122-2. As noted above, the multimedia server 104 and presence server 215 may be coupled to the network 102 or the PSTN.

As shown in FIG. 5A, at step 502, a user composes an e-mail using his e-mail client software 127 (FIG. 1) and selects the presence option (FIG. 3), sending the e-mail to the destination multimedia messaging server 104. The e-mail may be transmitted in a known protocol, such as SMTP (Simple Mail Transfer Protocol). This is shown in FIG. 5B at 550 and 552. At step 504 (FIG. 5A), the destination multimedia messaging server 104 and, in particular, the e-mail message presence module 114, acts to determine whether the recipient supports the e-mail presence feature. An exemplary interaction between the receive multimedia server 101 and the presence server 215 is shown at 554 in FIG. 5B. Further details on how the determination can be made are provided below in the discussion of FIGS. 6A-6G. If presence is not supported, then the system can proceed to A, as described below with reference to FIG. 7A-7D. If in step 504, the multimedia server 104 and the presence server 215 determine that presence is supported, then in step 506, the presence server 215 determines if the recipient is, in fact, present. As will be described in greater detail below, such a determination may be made by determining if the recipient is a registered user of a presence feature and/or a party on presence buddy lists and is in fact logged in to the system. If the user is determined to not be present, then the system proceeds to B, described below with reference to FIG. 8A-8C. Finally, at step 508, if the recipient is determined to be present, the e-mail is sent to him by the destination messaging server. The newly arrived message will be conspicuous to the user and not buried in spam. Thus, as shown in FIG. 5B, at 556, the destination multimedia messaging server 104 relays the message to the recipient 122-2, who can display it at 558. For example, the recipient may access the server for the e-mail using versions of POP (Post Office Protocol) or IMAP (Internet Mail Access Protocol).

Figure 6B:
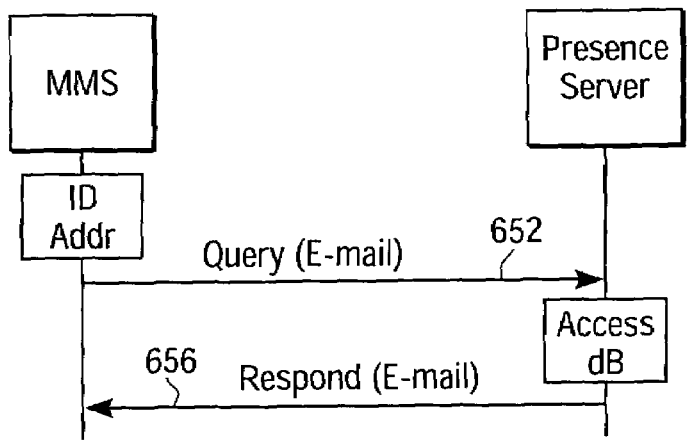

As discussed above, a variety of methods may be used to determine if the recipient supports presence features (i.e., step 504 of FIG. 5A). FIG. 6A-FIG. 6G illustrate exemplary methods for making such a determination. In particular, FIG. 6A and FIG. 6B illustrate a system in which the multimedia server 104 periodically queries the presence server 215 for presence information. At step 601 (FIG. 6A), the multimedia server 104 receiving the e-mail identifies the destination party. This is shown at 650 in FIG. 6B. More particularly, at 650, the receive multimedia server 104 receives the message and reads the e-mail header information for the destination party. At step 602 (FIG. 6A), the multimedia server 104 queries the presence server 215 as to whether the recipient supports presence. As shown at 652 in FIG. 6B, the multimedia server 101 transmits a request to the presence server 215, including the recipient's e-mail address. At 654, the presence server 215 uses the received e-mail address to check its database for the recipient. Such a database may be stored in memory 103 (FIG. 1). The presence server may make this determination, for example, by checking whether the recipient is a registered user of presence services, such as Instant Messaging. If the recipient is determined to have presence capabilities, then at step 606 (FIG. 6A), the presence server 215 informs the multimedia server 104 of this. Again, as shown in FIG. 6B, at 656, this signaling can include an identification of the recipient e-mail address. Once the recipient is determined to support presence features, the system can determine if he is logged in or active.

FIG. 6C and FIG. 6D are flowcharts illustrating use of buddy lists in determining if a party supports presence. More particularly in such embodiments, the presence server 215 accesses one or more buddy lists once the recipient is identified. It is noted that such buddy lists are typically associated with the Instant Messaging system, but can also be unique to the e-mail presence system. If the recipient is on the list(s), then he may be deemed to support presence services and it can be determined whether he is actually present, for example, by determining if he is logged in as an active user. In the simplest case, the recipient may already be on the sender's buddy list. In such a case, the presence server would already know that presence is supported and all the presence server need do is determine whether the recipient is logged on. However, a user may not necessarily want to add all e-mail recipient's to his buddy list; FIGS. 6C-6G thus illustrate a more automatic method of using buddy lists.

Figure 6E:
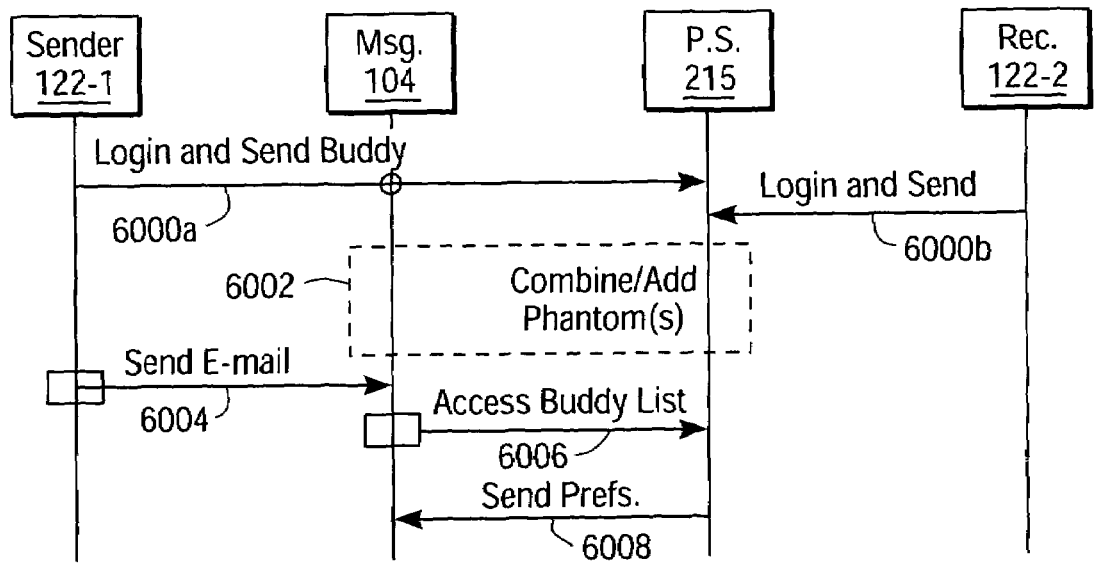

In particular, FIG. 6C illustrates combining buddy lists of registered users into a "super" buddy list for use in e-mail presence services. FIG. 6D illustrates adding the recipient or the messaging server as a presence on users' buddy lists. FIG. 6E is a corresponding signaling diagram. Once such a buddy list or lists have been configured, the presence server need merely determine in a standard fashion, whether the recipient is on such a list and is logged in.

Turning now to FIG. 6C, at step 640, the presence server 215 receives one or more buddy lists from users. At step 642 (FIG. 6C), the presence server 215 that has received the buddy lists then combines them into a single "super" buddy list. The buddy list presence information and function is then available to the presence server, in step 644. More particularly, upon receiving a request from the messaging server 104, the presence server 215 can determine whether the recipient is on any of the buddy lists.

Use of the "phantom" presence on a buddy list is generally similar and is shown in FIG. 6D. At step 660, the users log in and send their buddy lists. At step 662, in one embodiment, upon receipt of an e-mail for a recipient, the presence server 215 that has received the buddy lists then adds the recipient to the sender's buddy list as a "buddy." In another embodiment, the presence server 215 can add the message server itself to all buddy lists. Then, in step 664, the presence server 215 can access the phantom buddy lists when necessary or requested by the message server 104, to determine whether the recipient is either listed or present.

For example, as seen in FIG. 6E, users 122-1 and 122-2 can log in to the server using their Instant Messaging software and send their associated buddy lists, at 6000a and 6000b. The buddy lists can then be used by the presence server 215 for the capability determination (and the actual presence determination). For example, as denoted at 6002 in FIG. 6E, the presence server 215 can access its database of users and combine all buddy lists into one. Alternatively, the presence server 215 can add the multimedia server to all buddy lists as a phantom presence, or add the recipient to a sender's buddy list. Then, at 6004, when the sender 122-1 sends an e-mail to the messaging server, the e-mail message presence module 114 accesses the presence server 215 to determine if the recipient supports presence, as shown at 6006. In this embodiment, presence is supported if (i) the recipient has a buddy list at all; (ii) the recipient has successfully been added to the buddy list of the sender. The presence server 215 will thus access, or attempt to access, either the "super" buddy list; the sender's modified buddy list, or any buddy lists to which the messaging server is a member. Then, at 6008, whether the recipient supports presence can be reported back to the multimedia messaging server 104. The actual presence information can then be provided, assuming the recipient is logged in.

As noted above, according to one embodiment of the present invention, a user can send a test message to the multimedia server 104 to determine if an intended recipient supports presence features. Such a message may be generally similar to a message used to register to a list serve. For example, FIG. 3C shows an exemplary test message 3000. In the embodiment illustrated, the user can type "presence" into the Subject line 3002 and the message "Check [e-mail address] in the body 3004 of the message. The multimedia message server 104 can receive the message and identify it as requesting presence determinations. The presence server 215 will then determine if the recipient supports presence features.

Operation of such an embodiment is shown with reference to FIG. 6F and FIG. 6G. At step 670, the user can compose and send a test e-mail message, such as that shown in FIG. 3C. The message is received at the multimedia server 104 at 6100 (FIG. 6G). At step 672, the multimedia server 104 and, particularly, the message presence module 114, reads the message and accesses the presence server 215. The presence server 215 and multimedia server 104 then determine if the identified party supports presence at step 674. The actual determination may be made, for example, by a search of buddy lists, as discussed above, or a determination of whether the recipient is a registered user of a presence service. Thus, in FIG. 6G, at 6102, the multimedia server reads the subject header and determines that it is a presence check message. For example, the server may maintain a database of "in mail" commands and associated functions. The multimedia message server 104 then reads the body of the message to find the party whose presence is to be checked. The message server 104 then transmits a query to the presence server 215 at 6104, including the identity of the party to be checked. The presence server 215 may reply at 6106.

As noted above with reference to FIG. 5A, messages for users that do not support presence can be handled in a variety of ways. FIGS. 7A-7D illustrate such handling according to particular embodiments of the present invention. As shown above in FIG. 5A, such methods branch from the process at step A and return at step C.

At step 702 (FIG. 7A), the multimedia server 104 sends a message to the sender telling him that the recipient does not support presence and asking whether the message should be delivered. If it is OK, as determined at step 704, then the message can be delivered at step 708. If not, then at step 706, the message can be held or deleted.

This is illustrated more particularly in FIG. 7B. At 7002, the multimedia server 101 sends a message to the sender asking whether it is OK to send the message. The message to the sender may be displayed in the form of a pop up or other window, similar to those used when a return receipt is requested. Alternatively, the message may be in the form of an e-mail message. If the user responds with a NO, as shown at 7008, then the multimedia server can hold or delete the message, as shown at 7006. If the user indicates YES, at 7008, then the message is delivered, at 7010.

In other embodiments, the user can check one or more options during in the graphical user interface during message composition, as discussed with reference to FIG. 3A. The message will then be delivered according to the options checked. For example, as shown in FIG. 7C, at step 750, the multimedia server 104 and, particularly, the message presence module 114, checks the options that have been checked. At step 752, the multimedia server 104 determines if it is OK to deliver the message. If so, the message is delivered in accordance with the option selected, at step 756. Otherwise, at step 754, it is deleted or held.

This is seen with reference to the signaling diagram of FIG. 7D. At 7100, the multimedia server 104 reads the e-mail options that have been checked by the user. At 7102, the multimedia server 104 can hold or delete the message, depending on options checked; and at 7104 can transmit, again depending on options checked.

As noted above, a variety of options are available if the recipient supports presence features but is not present at the time the message arrives at the multimedia server. In certain cases, it may be desired to simply delete the message, but more often it would be desirable to wait until the recipient is present for delivery.

This is illustrated more particularly in FIG. 8A-FIG. 8C. For example, the multimedia server could simply hold the message until the presence server indicates that the recipient is present, as shown in FIG. 8A, at step 802.

In the alternative, the multimedia server could periodically query or access the presence server for the recipient's presence, as shown at FIG. 8C. As shown, at step 850, the multimedia server queries the presence server. If the recipient is not present, the multimedia server may wait a predetermined period before querying again. If the recipient is present, the multimedia server can send the message, in step 854.

Signaling is shown in FIG. 8B. At 8100, the multimedia server 104 holds a received message, e.g., in a temporary buffer and queries the presence server 215. The presence server, at 8102, may receive presence information, such as a buddy list, from the recipient. At 8104, the presence server 215 informs the multimedia server that the recipient is online. Finally, at 8106, the message is delivered.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications method, comprising:
    identifying an e-mail at a mail server as requesting a presence determination of a recipient prior to delivery, said identifying including identifying from the e-mail if a presence determination of said recipient has been requested by a sender of the e-mail;
    querying a presence server for a presence of said recipient;
    determining if said recipient is a client of a presence service supported by the presence server;
    sending a message to said sender asking whether the e-mail should be delivered if said recipient is not a client of a presence service supported by the presence server, and delivering said e-mail to said recipient if said sender indicates, responsive to said message, that the e-mail should be delivered;
    if said recipient is a client of the presence service, and said presence server indicates that said recipient is present, delivering the e-mail to said recipient; else
    if said presence server indicates that said recipient is not present, storing said e-mail at said mail server until said presence server indicates that said recipient is present.

2. A telecommunications method in accordance with claim 1, further comprising temporarily adding said recipient to a buddy list of the sender.

3. A telecommunications method in accordance with claim 1, further comprising said mail server periodically querying said presence server to determine if said recipient is present.

4. A telecommunications method in accordance with claim 1, wherein said mail server is added as a phantom member of one or more buddy lists, a phantom member being one which is tracked, but is not typically viewable by parties to whose buddy lists the presences are added.

5. A telecommunications method in accordance with claim 1, further comprising sending a test message to determine if a recipient supports presence service for e-mail.

6. A telecommunications server, comprising:
    a processing system including a storage medium containing computer executable components of:
        an e-mail presence module adapted to receive an e-mail and determine therefrom whether a recipient of said e-mail is a client of a presence service and if a presence of the recipient is to be determined as requested by a sender of the e-mail, wherein said telecommunications server is adapted to send a message to the sender of said e-mail asking whether the e-mail should be delivered if said recipient is not a client of the presence service, and deliver said e-mail to said recipient if said sender indicates that the e-mail should be delivered; and
        a presence module responsive to controls from said e-mail presence module and adapted to determine said presence of said recipient of said e-mail;
        if said recipient is a client of the presence service, and said presence module indicates that said recipient is present, said telecommunications server adapted to deliver the e-mail to said recipient; else
        if said presence module indicates that said recipient is not present, said telecommunications server adapted to store said e-mail until said presence module indicates that said recipient is present.

7. A telecommunications server in accordance with claim 6, said e-mail presence module adapted to read one or more function commands in said e-mail message to determine whether to check a presence of said recipient.

8. A telecommunications server in accordance with claim 6, said presence module adapted to determine a presence of a recipient using an Instant Messaging buddy list.

9. A telecommunications server in accordance with claim 8, wherein said recipient is temporarily added to a sender's buddy list.

10. A telecommunications server in accordance with claim 8, wherein a plurality of user buddy lists are combined into a super buddy list.

11. A telecommunications server in accordance with claim 8, wherein said server is added to one or more users' buddy lists.

12. A telecommunications system, comprising:
a plurality of electronic messaging clients;
at least one messaging server, said at least one messaging server comprising:
   a processing system including a storage medium containing computer executable components of:
   an e-mail presence module adapted to receive an e-mail and determine therefrom whether a recipient of said e-mail is a client of a presence service and if a presence of the recipient is to be determined as requested by a sender of the e-mail, wherein said messaging server is adapted to send a message to the sender of the e-mail asking whether the e-mail should be delivered if said recipient is not a client of the presence service, and deliver said e-mail to said recipient if said sender indicates that the e-mail should be delivered; and
   a presence module responsive to controls from said e-mail presence module and adapted to determine the presence of the recipient of said e-mail;
   if said recipient is a client of the presence service, and said presence module indicates that said recipient is present, adapting said messaging server to deliver the e-mail to the recipient; else
   if said presence module indicates that said recipient is not present, adapting said messaging server to store said e-mail until said presence module indicates that said recipient is present.

13. A telecommunications system in accordance with claim 12, said e-mail presence module adapted to read one or more function commands in said e-mail message to determine whether to check a presence of said recipient.

14. A telecommunications system in accordance with claim 12, said presence module adapted to determine a presence of a recipient using an Instant Messaging buddy list.

15. A telecommunications system in accordance with claim 14, wherein said recipient is temporarily added to a sender's buddy list.

16. A telecommunications system in accordance with claim 14, wherein a plurality of user buddy lists are combined into a super buddy list.

17. A telecommunications system in accordance with claim 14, wherein said server is added to one or more users' buddy lists.

18. A method for providing a telecommunications server, comprising:
providing an e-mail presence module adapted to receive an e-mail and determine therefrom whether a recipient of said e-mail is a client of a presence service and if a presence of the recipient is to be determined as requested by a sender of the e-mail;
adapting said telecommunications server to send a message to the sender of the e-mail asking whether the e-mail should be delivered if said recipient is not a client of the presence service, and deliver said e-mail to said recipient if said sender indicates that the e-mail should be delivered; and
providing a presence module responsive to controls from said e-mail presence module and adapted to determine the presence of the recipient of said e-mail;
if said recipient is a client of the presence service, and said presence e-mail module indicates that said recipient is present, adapting said telecommunications server to deliver the e-mail to the recipient; else
if said e-mail presence module indicates that said recipient is not present, adapting said telecommunications server to store said e-mail until said presence module indicates that said recipient is present.

19. A method in accordance with claim 18, said e-mail presence module adapted to read one or more function commands in said e-mail message to determine whether to check a presence of said recipient.

20. A method in accordance with claim 18, said presence module adapted to determine a presence of a recipient using an Instant Messaging buddy list.

21. A method in accordance with claim 20, wherein said recipient is temporarily added to a sender's buddy list.

22. A method in accordance with claim 20, wherein a plurality of user buddy lists are combined into a super buddy list.

23. A method in accordance with claim 20, wherein said server is added to one or more users' buddy lists.

24. A telecommunications method, comprising:
providing a plurality of electronic messaging clients;
providing at least one messaging server, said at least one messaging server comprising:
   an e-mail presence module adapted to receive an e-mail and determine therefrom whether a recipient of said e-mail is a client of a presence service and if a presence of the recipient is to be determined as requested by a sender of the e-mail; and
   a presence module responsive to controls from said e-mail presence module and adapted to determine the presence of the recipient of said e-mail; and
adapting said messaging server to send a message to the sender of the e-mail asking whether the e-mail should be delivered if said recipient is not a client of the presence service, and deliver said e-mail to said recipient if said sender indicates that the e-mail should be delivered;
if said recipient is a client of the presence service, and said presence module indicates that said recipient is present, adapting said messaging server to deliver the e-mail to the recipient; else
if said presence module indicates that said recipient is not present, adapting said messaging server to store said e-mail until said presence module indicates that said recipient is present.

25. A method in accordance with claim 24, said e-mail presence module adapted to read one or more function commands in said e-mail message to determine whether to check a presence of said recipient.

26. A method in accordance with claim 25, said presence module adapted to determine a presence of a recipient using an Instant Messaging buddy list.

27. A method in accordance with claim 26, wherein said recipient is temporarily added to a sender's buddy list.

28. A method in accordance with claim 26, wherein a plurality of user buddy lists are combined into a super buddy list.

29. A telecommunications system in accordance with claim 26, wherein said server is added to one or more users' buddy lists.

* * * * *